United States Patent
Macken et al.

(10) Patent No.: US 10,580,444 B1
(45) Date of Patent: *Mar. 3, 2020

(54) BOLOMETER AND CONTACT SENSOR ARRANGEMENT FOR A HEAT-ASSISTED MAGNETIC RECORDING DEVICE

(71) Applicant: Seagate Technology LLC, Cupertino, CA (US)

(72) Inventors: Declan Macken, Eden Prairie, MN (US); Jon Kartsen Klarqvist, Roseville, MN (US)

(73) Assignee: Seagate Technology LLC, Cupertino, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/272,448

(22) Filed: Feb. 11, 2019

Related U.S. Application Data

(63) Continuation of application No. 15/960,100, filed on Apr. 23, 2018, now Pat. No. 10,229,706, which is a continuation of application No. 15/678,409, filed on Aug. 16, 2017, now Pat. No. 9,972,350.

(60) Provisional application No. 62/415,134, filed on Oct. 31, 2016.

(51) Int. Cl.
| | |
|---|---|
| *G11B 5/09* | (2006.01) |
| *G11B 5/60* | (2006.01) |
| *G11B 5/48* | (2006.01) |
| *G11B 5/00* | (2006.01) |

(52) U.S. Cl.
CPC .......... *G11B 5/6005* (2013.01); *G11B 5/4866* (2013.01); *G11B 2005/0021* (2013.01)

(58) Field of Classification Search
None
See application file for complete search history.

(56) References Cited

U.S. PATENT DOCUMENTS

| | | | |
|---|---|---|---|
| 4,914,398 A | 4/1990 | Jove et al. | |
| 5,325,244 A * | 6/1994 | Takano | G11B 5/00 360/77.03 |
| 5,494,473 A | 2/1996 | Dupuis et al. | |
| 5,527,110 A | 6/1996 | Abraham et al. | |
| 5,712,747 A | 1/1998 | Voldman et al. | |
| 5,748,412 A | 5/1998 | Murdock et al. | |
| 5,768,068 A | 6/1998 | Eckberg et al. | |
| 5,850,374 A | 12/1998 | Abraham et al. | |
| 5,896,249 A | 4/1999 | Fontana, Jr. et al. | |

(Continued)

*Primary Examiner* — Peter Vincent Agustin
(74) *Attorney, Agent, or Firm* — Mueting, Raasch & Gebhardt, P.A.

(57) ABSTRACT

A slider of a heat-assisted magnetic recording head comprises an air bearing surface and an optical waveguide configured to receive light from a laser source. The slider comprises a plurality of electrical bond pads including a first bond pad and a second bond pad. A first resistive sensor is configured to sense for spacing changes and contact between the slider and a magnetic recording medium at or near a first close point of the slider. A second resistive sensor is configured to sense for spacing changes and contact between the slider and the medium at or near a second close point of the slider. A bolometer is situated at a location within the slider that receives at least some of the light communicated along the optical waveguide. The first resistive sensor, the second resistive sensor, and the bolometer are coupled together and between the first and second bond pads.

20 Claims, 8 Drawing Sheets

(56) References Cited

U.S. PATENT DOCUMENTS

| | | | |
|---|---|---|---|
| 6,021,024 A * | 2/2000 | Akiyama | G11B 5/012 |
| | | | 360/234.6 |
| 6,034,849 A | 3/2000 | Takizawa | |
| 6,052,249 A | 4/2000 | Abraham | |
| 6,347,983 B1 | 2/2002 | Hao et al. | |
| 6,570,730 B1 * | 5/2003 | Lewis | G11B 5/58 |
| | | | 29/603.04 |
| 6,813,118 B2 | 11/2004 | Pust et al. | |
| 7,088,543 B2 | 8/2006 | Satoh et al. | |
| 7,133,254 B2 | 11/2006 | Hamann et al. | |
| 7,362,534 B1 | 4/2008 | Schreck et al. | |
| 7,446,977 B2 | 11/2008 | Nikitin et al. | |
| 7,466,516 B2 | 12/2008 | Lille | |
| 7,551,406 B1 | 6/2009 | Thomas et al. | |
| 7,643,250 B2 | 1/2010 | Araki et al. | |
| 7,782,568 B2 | 8/2010 | Shiraki et al. | |
| 7,928,386 B2 | 4/2011 | Frey | |
| 7,936,538 B1 | 5/2011 | Zhang et al. | |
| 7,969,687 B2 | 6/2011 | Lee et al. | |
| 8,098,450 B2 | 1/2012 | Baumgart et al. | |
| 8,159,780 B2 | 4/2012 | Brand | |
| 8,169,751 B2 | 5/2012 | Albrecht et al. | |
| 8,297,113 B2 | 10/2012 | Liners et al. | |
| 8,310,779 B2 | 11/2012 | Hanchi | |
| 8,391,107 B2 | 3/2013 | Gage et al. | |
| 8,400,736 B2 | 3/2013 | Greminger et al. | |
| 8,432,636 B2 | 4/2013 | Brand | |
| 8,451,696 B2 | 5/2013 | Huang et al. | |
| 8,705,323 B2 | 4/2014 | Contreras et al. | |
| 8,804,272 B1 | 8/2014 | Dakroub et al. | |
| 8,804,275 B1 * | 8/2014 | Mate | G11B 5/6029 |
| | | | 360/31 |
| 8,810,947 B1 | 8/2014 | Ren et al. | |
| 8,824,085 B2 | 9/2014 | Wilson et al. | |
| 8,842,507 B1 | 9/2014 | Hirano et al. | |
| 8,879,189 B2 | 11/2014 | Miyamoto et al. | |
| 8,908,483 B1 | 12/2014 | Ren et al. | |
| 8,937,791 B1 | 1/2015 | Olson et al. | |
| 8,953,275 B2 | 2/2015 | Chou et al. | |
| 9,030,773 B2 | 5/2015 | Macken et al. | |
| 9,042,210 B2 | 5/2015 | Macken | |
| 9,047,926 B2 | 6/2015 | Contreras et al. | |
| 9,153,272 B1 | 10/2015 | Rausch | |
| 9,177,577 B2 | 11/2015 | Macken et al. | |
| 9,202,499 B2 | 12/2015 | Kiely et al. | |
| 9,236,081 B1 | 1/2016 | Chu et al. | |
| 9,418,688 B1 * | 8/2016 | Rausch | G11B 5/3967 |
| 9,536,555 B1 | 1/2017 | Duda et al. | |
| 9,558,774 B1 * | 1/2017 | Macken | G11B 5/607 |
| 9,607,640 B2 | 3/2017 | Macken et al. | |
| 9,607,641 B1 * | 3/2017 | Ramakrishnan | G11B 5/607 |
| 9,607,642 B1 * | 3/2017 | Yang | G11B 5/6076 |
| 9,691,424 B2 | 6/2017 | Duda et al. | |
| 9,747,937 B1 | 8/2017 | Duda et al. | |
| 9,799,361 B1 | 10/2017 | Duda et al. | |
| 9,824,705 B1 * | 11/2017 | Macken | G11B 7/1263 |
| 9,875,767 B2 | 1/2018 | Duda et al. | |
| 9,972,350 B1 * | 5/2018 | Macken | G11B 5/6005 |
| 10,127,940 B1 | 11/2018 | Wwessel et al. | |
| 10,229,706 B1 * | 3/2019 | Macken | G11B 5/6005 |
| 2007/0035881 A1 | 5/2007 | Burbank et al. | |
| 2007/0230056 A1 | 10/2007 | Beach et al. | |
| 2009/0040645 A1 | 2/2009 | Shimazawa et al. | |
| 2009/0052076 A1 | 2/2009 | Shimazawa et al. | |
| 2009/0052077 A1 | 2/2009 | Tanaka et al. | |
| 2009/0195930 A1 | 8/2009 | Lille | |
| 2009/0262460 A1 * | 10/2009 | Hanchi | G11B 5/3133 |
| | | | 360/235.4 |
| 2010/0226044 A1 | 9/2010 | Iwase | |
| 2011/0013316 A1 | 1/2011 | Brand | |
| 2011/0228651 A1 | 9/2011 | Gage et al. | |
| 2011/0248167 A1 | 10/2011 | Gurvitch et al. | |
| 2011/0299367 A1 | 12/2011 | Naniwa et al. | |
| 2012/0051196 A1 | 3/2012 | Grobis et al. | |
| 2012/0113207 A1 | 5/2012 | Zheng | |
| 2012/0120519 A1 | 5/2012 | Kunkel et al. | |
| 2012/0120522 A1 * | 5/2012 | Johnson | G11B 5/607 |
| | | | 360/75 |
| 2012/0120527 A1 | 5/2012 | Kunkel et al. | |
| 2013/0155538 A1 * | 6/2013 | Contreras | G11B 5/6029 |
| | | | 360/46 |
| 2013/0188273 A1 | 7/2013 | Miyamoto et al. | |
| 2013/0286802 A1 | 10/2013 | Kiely | |
| 2014/0269238 A1 | 9/2014 | Kautzky et al. | |
| 2014/0269838 A1 | 9/2014 | Macken | |
| 2015/0085630 A1 * | 3/2015 | Macken | G11B 5/314 |
| | | | 369/13.33 |
| 2015/0103430 A1 | 4/2015 | Gadbois et al. | |
| 2015/0109892 A1 | 4/2015 | Contreras et al. | |
| 2015/0194172 A1 * | 7/2015 | Peng | G11B 5/4866 |
| | | | 369/13.33 |
| 2015/0279430 A1 * | 10/2015 | Trantham | G11B 5/314 |
| | | | 369/13.26 |
| 2015/0380021 A1 * | 12/2015 | Kunkel | G11B 5/607 |
| | | | 360/235.4 |
| 2016/0104514 A1 | 4/2016 | Burnett et al. | |
| 2016/0284372 A1 | 9/2016 | Duda et al. | |
| 2017/0032810 A1 | 2/2017 | Macken et al. | |

* cited by examiner

BOLOMETER AND CONTACT SENSOR ARRANGEMENT FOR A HEAT-ASSISTED MAGNETIC RECORDING DEVICE

RELATED PATENT DOCUMENTS

This application is a continuation of U.S. patent application Ser. No. 15/960,100, filed Apr. 23, 2018, which is as continuation of U.S. patent application Ser. No. 15/678,409, filed Aug. 16, 2017, now U.S. Pat. No. 9,972,350, which claims the benefit of Provisional Patent Application Ser. No. 62/415,134, filed on Oct. 31, 2016, to which priority is claimed and which are incorporated herein by reference in their entireties.

SUMMARY

Embodiments are directed to an apparatus comprising a slider of a heat-assisted magnetic recording head which includes an air bearing surface and an optical waveguide configured to receive light from a laser source. The slider comprises a plurality of electrical bond pads including a first bond pad and a second bond pad. A first resistive sensor is configured to sense for spacing changes and contact between the slider and a magnetic recording medium at or near a first close point of the slider. A second resistive sensor is configured to sense for spacing changes and contact between the slider and the medium at or near a second close point of the slider. A bolometer is situated at a location within the slider that receives at least some of the light communicated along the optical waveguide. The first resistive sensor, the second resistive sensor, and the bolometer are coupled together and between the first and second bond pads.

Other embodiments are directed to an apparatus comprising a slider of a heat-assisted magnetic recording head which includes an air bearing surface and an optical waveguide configured to receive light from a laser source. The slider comprises a plurality of electrical bond pads including a first bond pad and a second bond pad. A first resistive sensor is configured to sense for spacing changes and contact between the slider and a magnetic recording medium at or near a first close point of the slider. A second resistive sensor is configured to sense for spacing changes and contact between the slider and the medium at or near a second close point of the slider. A bolometer is situated at a location within the slider that receives at least some of the light communicated along the waveguide. A reference thermal sensor is coupled to the bolometer. The reference thermal sensor is situated at a location within the slider unexposed to the light communicated along the optical waveguide. Signals produced by the bolometer and the reference sensor in response to an ambient temperature change are of substantially equal magnitude but of opposite polarity. The first resistive sensor, the second resistive sensor, bolometer, and reference thermal sensor are coupled together and between the first and second bond pads.

The above summary is not intended to describe each disclosed embodiment or every implementation of the present disclosure. The figures and the detailed description below more particularly exemplify illustrative embodiments.

BRIEF DESCRIPTION OF THE DRAWINGS

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Figure 1:
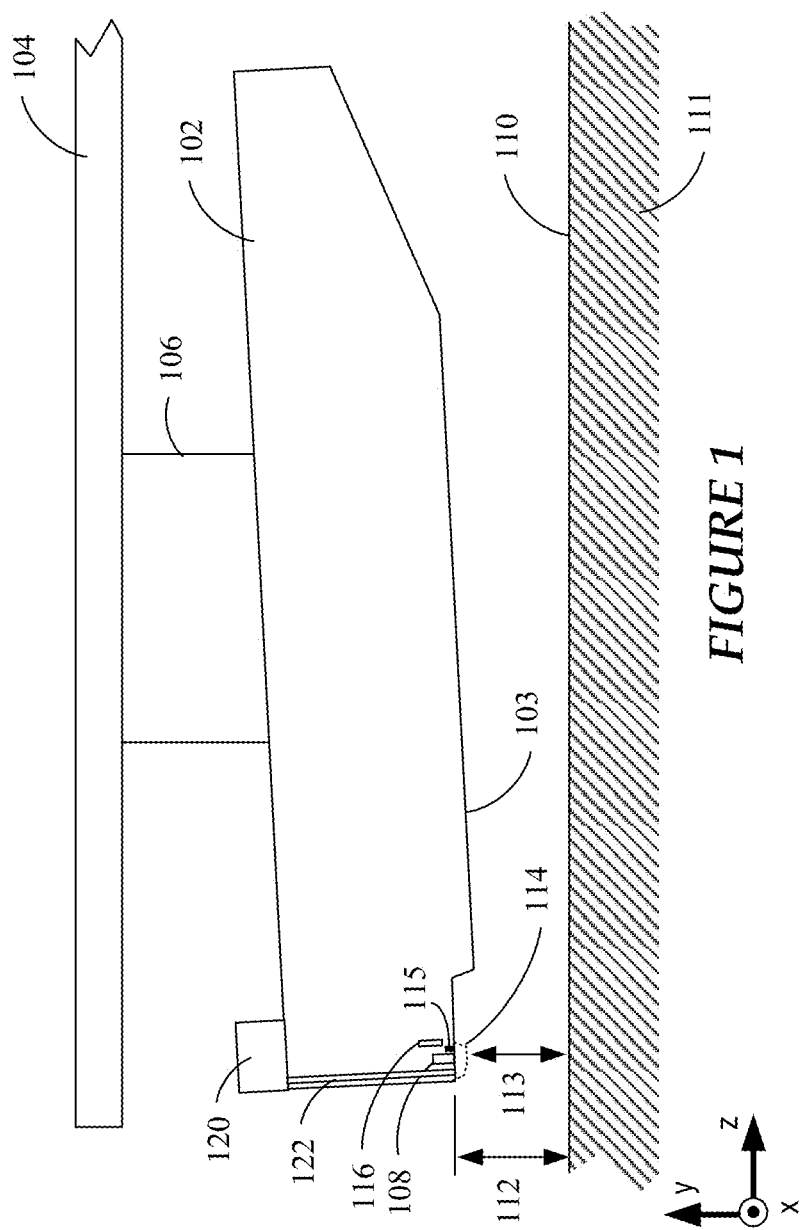
FIG. 1 is a cross-sectional view of a slider in which the various embodiments disclosed herein may be implemented.

The present disclosure generally relates to laser power monitoring in data storage devices that employ heat-assisted magnetic recording (HAMR), also referred to as energy-assisted magnetic recording (EAMR), thermally-assisted magnetic recording (TAMR), and thermally-assisted recording (TAR). This technology uses a laser source and a near-field transducer to heat a small spot on a magnetic disk during recording. The heat lowers magnetic coercivity at the spot, allowing a write transducer to change the orientation of a magnetic domain at the spot. Due to the relatively high coercivity of the medium after cooling, the data is less susceptible to paramagnetic effects that can lead to data errors.

A HAMR drive generally uses a laser diode to heat the recording medium to aid in the recording process. The laser diode generates heat and is also heated by other components (writer, reader, heater elements) in the magnetic slider. During write operation, for example, laser diode heating can vary the junction temperature of the laser diode, causing a shift in laser emission wavelength, leading to a change of optical feedback from optical path in slider to the cavity of the laser diode, a phenomenon that is known to lead to mode hopping and/or power instability of the laser diode. Mode hopping is particularly problematic in the context of single-frequency lasers. Under some external influences, a single-frequency laser may operate on one resonator mode (e.g., produce energy with a first wavelength) for some time, but then suddenly switch to another mode (produce energy, often with different magnitude, with a second wavelength) performing "mode hopping." Temperature variation is known to cause mode hopping in laser diodes. Mode hopping is problematic for HAMR applications, as mode hopping leads to laser output power jumping and magnetic transition shifting from one block of data to another. Large transition shifts in a block of data may not be recoverable by channel decoding, resulting in error bits.

Monitoring of laser power is important to ensure proper operation of the laser diode and to avoid instabilities such as mode hopping. Conventional laser power monitoring involves use of an external photodiode situated on a submount that also supports the laser diode. The photodiode senses output optical power of the laser diode, and can be used to determine if the laser performance is sufficiently stable to ensure adequate writing performance. However, future integrated HAMR recording transducers will not be able to include an external photodiode due to reduced submount dimensions. For HAMR hard drives, it is critical to detect small fluctuations in laser output optical power delivered to the near-field transducer (NFT), which requires highly accurate optical or temperature sensing. Typically, an electrical element such as an internal laser power monitor (e.g., photodiode) would require extra, dedicated electrical bond pads to provide highly accurate optical or temperature sensing. Since additional bond pads add cost and complexity to the head gimbal assembly, it is desirable to provide for sensing of laser output optical power without the need for such extra electrical bond pads.

An important function of a hard disk drive (HDD) configured for HAMR is to accurately set the clearance between the slider and the surface of the magnetic storage medium of the HDD. Toward this end, various techniques have been developed to set clearance that involve incrementally reducing fly height of the slider until contact is made between the slider and the recording medium. Once contact is made, an appropriate clearance is set such that slider is made to fly close to, but spaced apart from, the surface of the medium during operation. Accurate contact detection is desired in order to accurately set clearance of the slider. Moreover, a slider typically includes a multiplicity of close points. For example, a slider may have a close point at the NFT/write pole (e.g., during write operations) and at the reader (e.g., during read operations) of the slider. It is important to detect contact at each of the close points of the slider.

Embodiments of the disclosure are directed to a sensor arrangement internal to the slider that can be used to facilitate monitoring of output optical power of the laser diode and detection of contact at a plurality of close points. Some embodiments are directed to a sensor arrangement that detects contact at a multiplicity of close points and monitors output optical power of the laser diode with an improved signal-to-noise ratio by compensating for thermal background conditions that can otherwise confound temperature measurements made by the sensor. Embodiments are directed to a sensor arrangement that detects contact at a multiplicity of close points and monitors output optical power of the laser diode while requiring connection to only two electrical bond pads of the slider, thereby obviating the need for additional bond pads to operate the sensor arrangement.

According to various embodiments, a bolometer can be situated in or near the optical light path of the slider so that it absorbs or harvests light communicated along the optical waveguide, while minimally or negligibly impacting light transmission (e.g., minimal or negligible effect on waveguide efficiency and/or the mode profile along the light delivery path). For example, the bolometer can be situated within the internal body of the slider proximate the core of the waveguide, such as within the cladding of the waveguide. In various embodiments, the bolometer comprises a thin metallic element, such as a wire, with a high thermal coefficient of resistance (TCR).

In some embodiments, a reference sensor, such as a resistor, can be situated proximate the bolometric sensor but away from the light path of slider, such that the bolometer and reference sensor are on the same isotherm. In other words, the reference sensor is situated close to the bolometer so that both components are exposed to substantially the same thermal background (e.g., same ambient temperature), but outside of the light path so that no light impinges on the reference sensor. The bolometer and the reference sensor are configured and connected to effectively subtract off signal content of the bolometer representative of the thermal background experienced by the bolometer and the reference sensor. Having subtracted off the non-optical thermal component of the bolometer signal, the remaining component of the bolometer signal represents the temperature and temperature variations due predominately (e.g., solely) to output optical power and power fluctuations of the laser diode.

The reference sensor can be a thin metallic element, such as a wire, with a high TCR or other type of resistance sensing apparatus. In some embodiments, the bolometer and reference sensor can have substantially the same geometry (e.g., size and shape). However, the TCRs of the bolometer and reference sensor have different signs (e.g., one positive, the other negative).

When a small bias current is applied across the bolometer, any change in bolometer temperature will create a corresponding change in measured voltage. This change in bolometer temperature results from changes in output optical power of the laser diode and from changes in ambient temperature. At the same time, any changes in ambient temperature are also sensed by the reference sensor. Because the bolometer and the reference sensor have opposite TCRs, the common ambient temperature component of the bolometer signal is subtracted off, leaving only the temperature and temperature changes due to output optical power of the laser diode. As a result, the bolometer can be used to monitor fluctuations in laser output optical power that cause fluctuations in absorption and temperature in the bolometric sensor with high fidelity. In general, a bolometer-based internal power monitor according to embodiments of the disclosure does not appreciably decrease light path efficiency yet still absorbs enough light to create a sufficiently large signal for detection.

FIG. 1 shows a side view of a slider 102 configured for heat-assisted magnetic recording in accordance with a representative embodiment. The slider 102 may be used in a magnetic data storage device, e.g., a hard disk drive. The slider 102 may also be referred to herein as a recording head, read/write transducer, etc. The slider 102 is coupled to an arm 104 by way of a suspension 106 that allows some relative motion between the slider 102 and arm 104. The slider 102 includes read/write transducers 108 at a trailing edge that are held proximate to a surface 110 of a magnetic recording medium 111, e.g., magnetic disk. The slider 102 further supports a laser 120 and incorporates an optical waveguide 122. The waveguide 122 delivers light from the laser 120 to components (e.g., a near-field transducer) near the read/write transducers 108.

When the slider 102 is located over surface 110 of recording medium 111, a flying height 112 is maintained between the slider 102 and the surface 110 by a downward force of arm 104. This downward force is counterbalanced by an air cushion that exists between the surface 110 and an air bearing surface 103 (also referred to herein as a "media-facing surface") of the slider 102 when the recording medium 111 is rotating. It is desirable to maintain a predetermined slider flying height 112 over a range of disk rotational speeds during both reading and writing operations to ensure consistent performance. Region 114 is a generally referred to as a "close point" of the slider 102, which is understood to be the closest spacing between the read/write transducers 108 and the magnetic recording medium 111, and generally defines the head-to-medium spacing 113. Typically, the writer/NFT region will define a writer close point during write operations, and the reader region will define a reader close point during read operations.

Figure 2:
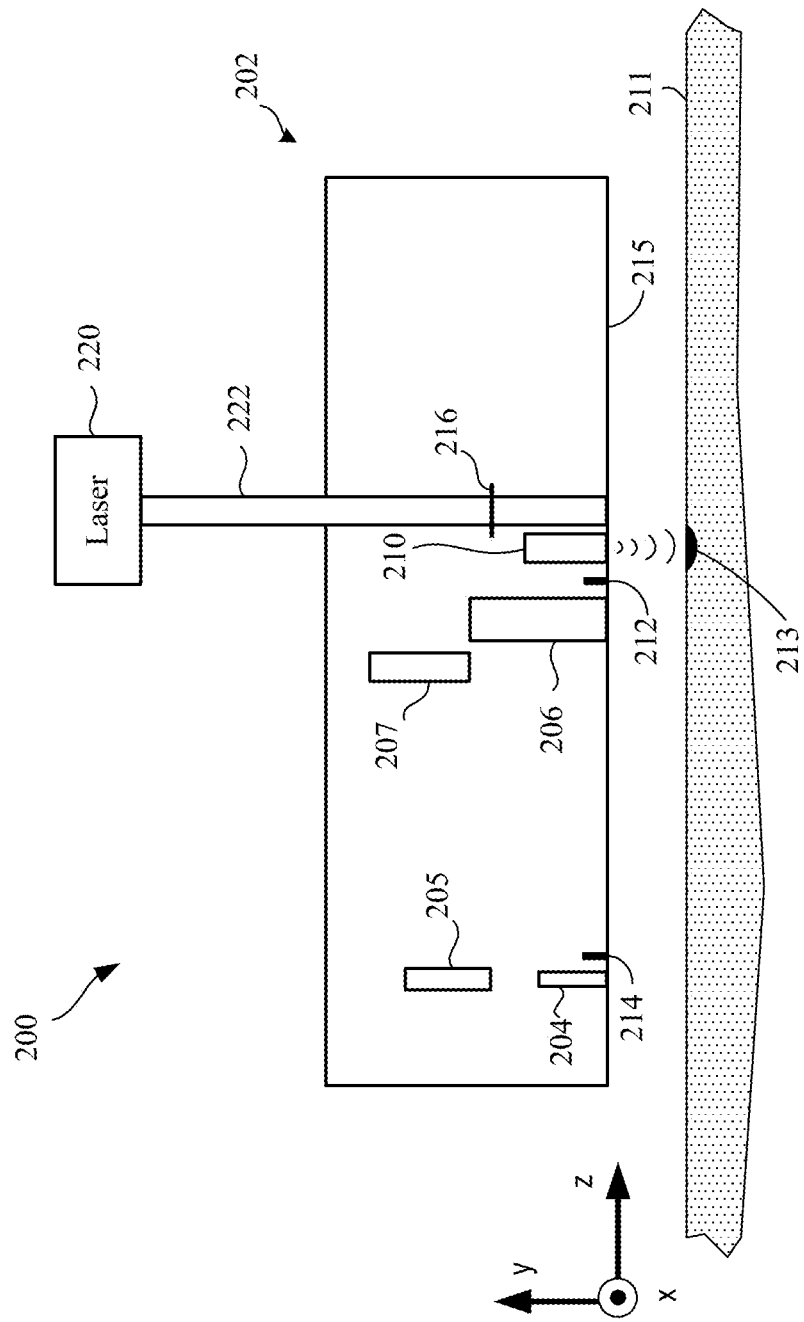
FIG. 2 is a cross-sectional view of a slider in which the various embodiments disclosed herein may be implemented.

FIG. 2 shows a HAMR head arrangement 200 in accordance with various embodiments. The HAMR head arrangement 200 includes a slider 202 positioned proximate a rotating magnetic medium 211. The slider 202 includes a reader 204 and a writer 206 proximate an air bearing surface (ABS) 215 for respectively reading and writing data from/to the magnetic medium 211. The writer 206 is located adjacent an NFT 210 which is optically coupled to a light source 220 (e.g., laser diode) via a waveguide 222. The light source 220 can be mounted external, or integral, to the slider 202. The light source 220 energizes the NFT 210 via the waveguide 222. The writer 206 includes a corresponding heater 207, and the reader 204 includes a corresponding heater 205 according to various embodiments. The writer heater 207 can be powered to cause protrusion of the ABS 215 predominately in the ABS region at or proximate the writer 206, and the reader heater 205 can be powered to cause protrusion of the ABS 215 predominately in the ABS region at or proximate the reader 204. Power can be controllably delivered independently to the heaters 207 and 205 to adjust the fly height (e.g., clearance) of the slider 202 relative to the surface of the recording medium 211. One or more thermal sensors 212, 214 can be situated at various locations on the slider 202 at or near the ABS 215 for purposes of monitoring temperature, head-medium spacing changes, and head-medium contact. A bolometer 216 can be situated along the light path to detect changes in output optical power of the light source 220.

A HAMR device utilizes the types of optical devices described above to heat a magnetic recording media (e.g., hard disk) in order to overcome superparamagnetic effects that limit the areal data density of typical magnetic media. When writing with a HAMR device, the electromagnetic energy (e.g., laser or light) is concentrated onto a small hot spot 213 over the track of the magnetic medium 211 where writing takes place, as shown in FIG. 2. The light from the source 220 propagates to the NFT 210, e.g., either directly from the source 220 or through the mode converter or by way of a focusing element. Other optical elements, such as couplers, mirrors, prisms, etc., may also be formed integral to the slider. As a result of what is known as the diffraction limit, optical components cannot be used to focus light to a dimension that is less than about half the wavelength of the light. The lasers used in some HAMR designs produce light with wavelengths on the order of 700-1550 nm, yet the desired hot spot 213 is on the order of 50 nm or less. Thus, the desired hot spot size is well below half the wavelength of the light. Optical focusers cannot be used to obtain the desired hot spot size, being diffraction limited at this scale. As a result, the NFT 210 is employed to create a hot spot on the media.

The NFT 210 is a near-field optics device configured to generate local surface plasmon resonance at a designated (e.g., design) wavelength. The NFT 210 is generally formed from a thin film of plasmonic material (e.g., gold, silver, copper) on a substrate. In a HAMR slider 202, the NFT 210 is positioned proximate the write pole of the writer 206. The NFT 210 is aligned with the plane of the ABS 215 parallel to the read/write surface of the magnetic medium 211. The NFT 210 achieves surface plasmon resonance in response to the incident electromagnetic energy. The plasmons generated by this resonance are emitted from the NFT 210 towards the magnetic medium 211 where they are absorbed to create the hot spot 213. At resonance, a high electric field surrounds the NFT 210 due to the collective oscillations of electrons at the metal surface (e.g., substrate) of the magnetic medium 211. At least a portion of the electric field surrounding the NFT 210 tunnels into, and gets absorbed by, the magnetic medium 211, thereby raising the temperature of the spot 213 on the medium 211 as data is being recorded.

Figure 3:
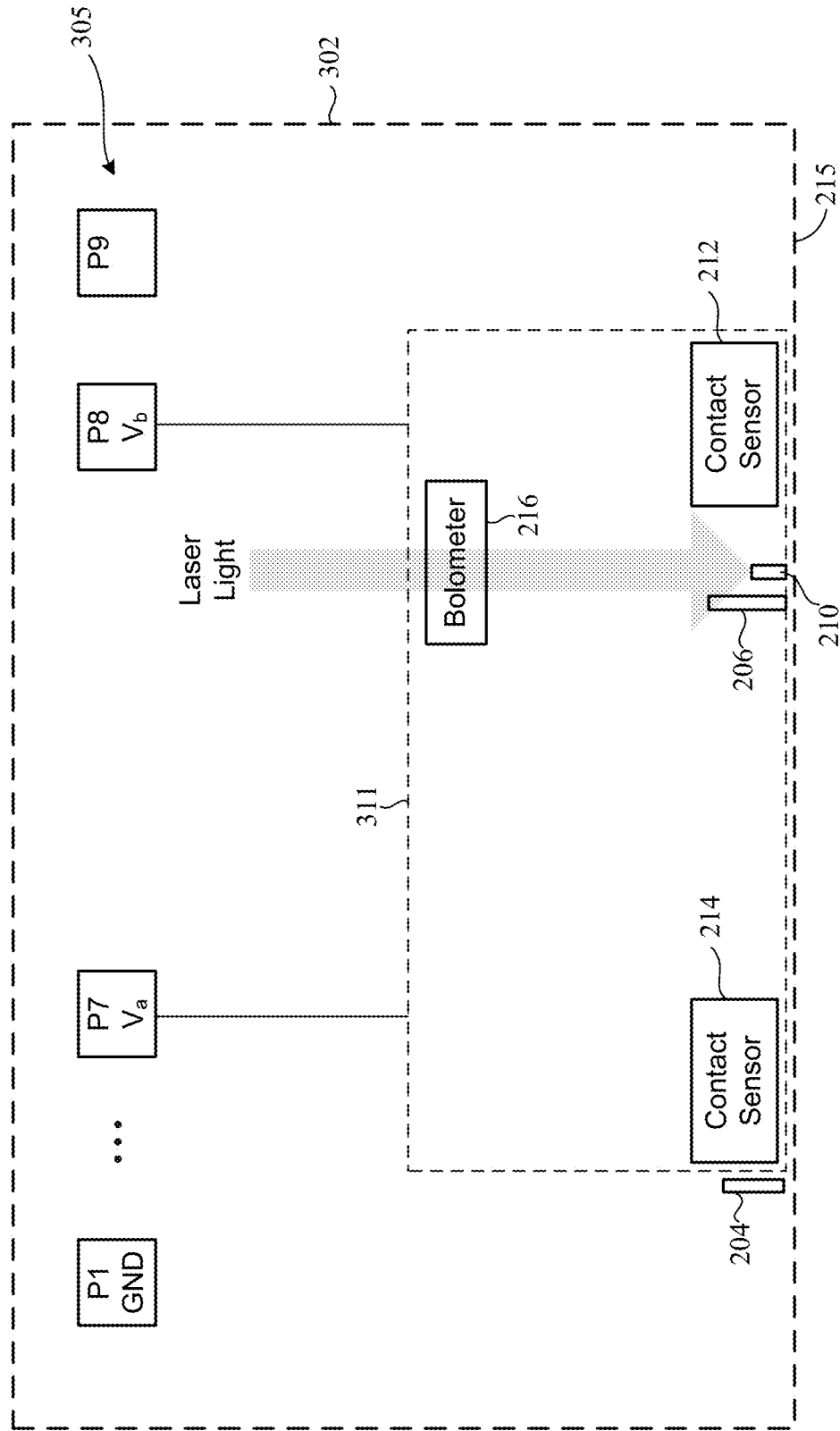
FIG. 3 shows a portion of a HAMR slider that incorporates an optical and contact sensor arrangement in accordance with various embodiments.

FIG. 3 shows a portion of a HAMR slider 302 that incorporates an optical and contact sensor arrangement in accordance with various embodiments. The slider 302 shown in FIG. 3 supports a multiplicity of components and sensors coupled to a set 305 of bond pads (P1-P9). The set 305 of bond pads includes eight electrical bond pads (P2-P9) and one ground pad (P9), also referred to as a shared return path. The term "electrical bond pad" refers to a bond pad that is coupled to a detector or a bias source, such as a voltage or current source (AC or DC) that provides power for an electrical or optical component or components. It is noted that the polarity of the electrical bond pads can change during operation, such that a given pad can be at a positive potential at one time and a negative potential at another time. The slider 302 shown in FIG. 3 utilizes eight electrical bond pads (P2-P9), it being understood that the number of electrical bond pads can vary depending on the particular slider design. For simplicity of explanation, only three electrical bond pads (P7-P9) and one ground pad (P1) are illustrated in FIG. 3 (and FIG. 4).

FIG. 3 shows a sensor arrangement 311 that includes a bolometer 216, a first contact sensor 212, and a second contact sensor 214. As will be discussed below, the bolometer 216, first contact sensor 212, and second contact sensor 214 can be connected together in a number of different ways. Notably, the sensor arrangement 311 is coupled to only two of the electrical bond pads 305 of the slider 302. As shown, the sensor arrangement 311 is coupled between a first bond pad, P7, and a second bond pad, P8. In the embodiment shown in FIG. 3, the sensor arrangement 311 is coupled only to first and second bond pads P7 and P8, and to no other electrical bond pad or ground pad. Using a conventional connection strategy, each of the bolometer 216, first contact sensor 212, and second contact sensor 214 would be connected to individual pairs of bond pads, thus requiring up to six bond pads. In the embodiment shown in FIG. 3 and in other figures, the bolometer 216, first contact sensor 212, and second contact sensor 214 can be connected to each other in a manner that requires only two bond pads, e.g., P7 and P8. The sensor arrangement 311 shown in FIG. 3 can be considered a dual-ended sensor arrangement which requires only two electrical bond pads for proper operation.

The bolometer 216 is disposed on the slider 302 at a location that receives at least some of the light produced by a laser source that propagates through an optical waveguide (see waveguide 222 in FIG. 2) of the slider 302. The propagating light impinges on an NFT 210 which is shown situated proximate to a writer 206. The bolometer 216 can be situated within cladding of the optical waveguide, for example, and preferably has negligible impact on optical efficiency (e.g., reduces optical efficiency by less than 5%). For example, the bolometer 216 can be situated within about 5 μm from a centerline of the core of the optical waveguide. The response of the bolometer 216 is based primarily on the light impinging on it from the optical waveguide and the ambient temperature at the location where the bolometer 216 is situated on the slider 302.

The bolometer 216 can be implemented as a resistive sensor having a temperature coefficient of resistance. For example, the bolometer 216 can be a metal wire having a TCR fabricated into the slider 302. Suitable materials for fabricating the bolometer 216 include Pt, NiFe, Ni, and other materials that have high TCR. In some implementations, it may be desirable to fabricate the electrical conductors (e.g., traces or leads) that connect the bolometer 216 to the bond pads P7 and P8 from a material having a relatively low, or near zero, TCR. Suitable materials include NiCu alloys. Use of low or near zero TCR materials for the electrical conductors insures that nearly all temperature-related changes in the bolometer 216 are due to temperature changes experienced by the bolometer 216, rather than by the electrical conductors coupled thereto.

The contact sensors 212 and 214 shown in FIG. 3 are situated at or near the ABS 215 of the slider 302. Each of the contact sensors 212 and 214 is preferably situated at a close point of the slider 302. For example, the contact sensor 212 is shown situated at or near a close point of the writer 206/NFT 210, and the contact sensor 214 is situated at or near a close point of a reader 204 of the slider 302. It is understood that more than two contact sensors 212, 214 can be incorporated in the slider 302 for use at or near more than two close points of the slider 302. The contact sensors 212 and 214 can be used for setting clearance, determining fly height, and detecting asperities, voids, and other topographical features of a magnetic recording medium. In some embodiments, one of the contact sensors is configured to detect head-medium contact, and the other contact sensor is a dual-purpose sensor configured to detect asperities and head-medium contact. The contact sensors 212 and 214 can be implemented as thermal sensors, such as a resistive temperature sensor (e.g., TCR sensor), for example. The contact sensors 212 and 214 can be implemented as DETCRs (dual-ended TCR sensors). The contact sensors 212 and 214 can be formed from high TCR materials, such as NiFe, Ni, Pt, Ru, and Rh.

It is noted that a differential amplifier can be coupled to bond pads P7 and P8 for purposes of detecting signals produced by the sensor arrangement 311. A logic device or processor, for example, can be coupled to the differential amplifier and configured to determine the magnitude of the detected changes in output optical power of the laser source. The logic device or processor can further be configured to adjust current supplied to the laser source in response to the detected changes in output optical power sensed by the sensor arrangement 311 (e.g., to avoid mode hopping). A logic device or processor can also be configured to detect contact between either of the contact sensors 212, 214 of the sensor arrangement 311 and a surface or topographical feature (e.g., asperity, void) of a magnetic recording medium. When the slider 302 contacts the medium, for example, the slider surface temperature will drop due to a change in heat transfer rate resulting from the contact. The slider surface temperature will then increase due to heating from the heater and frictional heating. The abrupt drop in temperature or excursion in temperature trajectory of the contact sensor signal can be used to detect head-to-medium contact.

According to embodiments in which the sensor arrangement 311 is coupled to only two electrical bond pads 305 of the slider 302, the contact sensors 212, 214 and the bolometer 216 are simultaneously active (when energized) or inactive (when de-energized). Operations involving the contact sensors 212 and 214 can be implemented at times when the bolometer 216 is not active (e.g., at times other than during write operations). During active use of the contact sensors 212 and 214, the bolometer 216 remains quiescent, contributing little or no signal to the output signal sensed at the bond pads P7 and P8. During use of the bolometer 216 (e.g., during a write operation), the contact sensors 212 and 214 are inactive and remain quiescent. The signals produced by the bolometer 216 during inactivity of the contact sensors 212 and 214 can be sensed across bond pads P7 and P8 with little to no signal contribution from the contact sensors 212 and 214.

Figure 4:
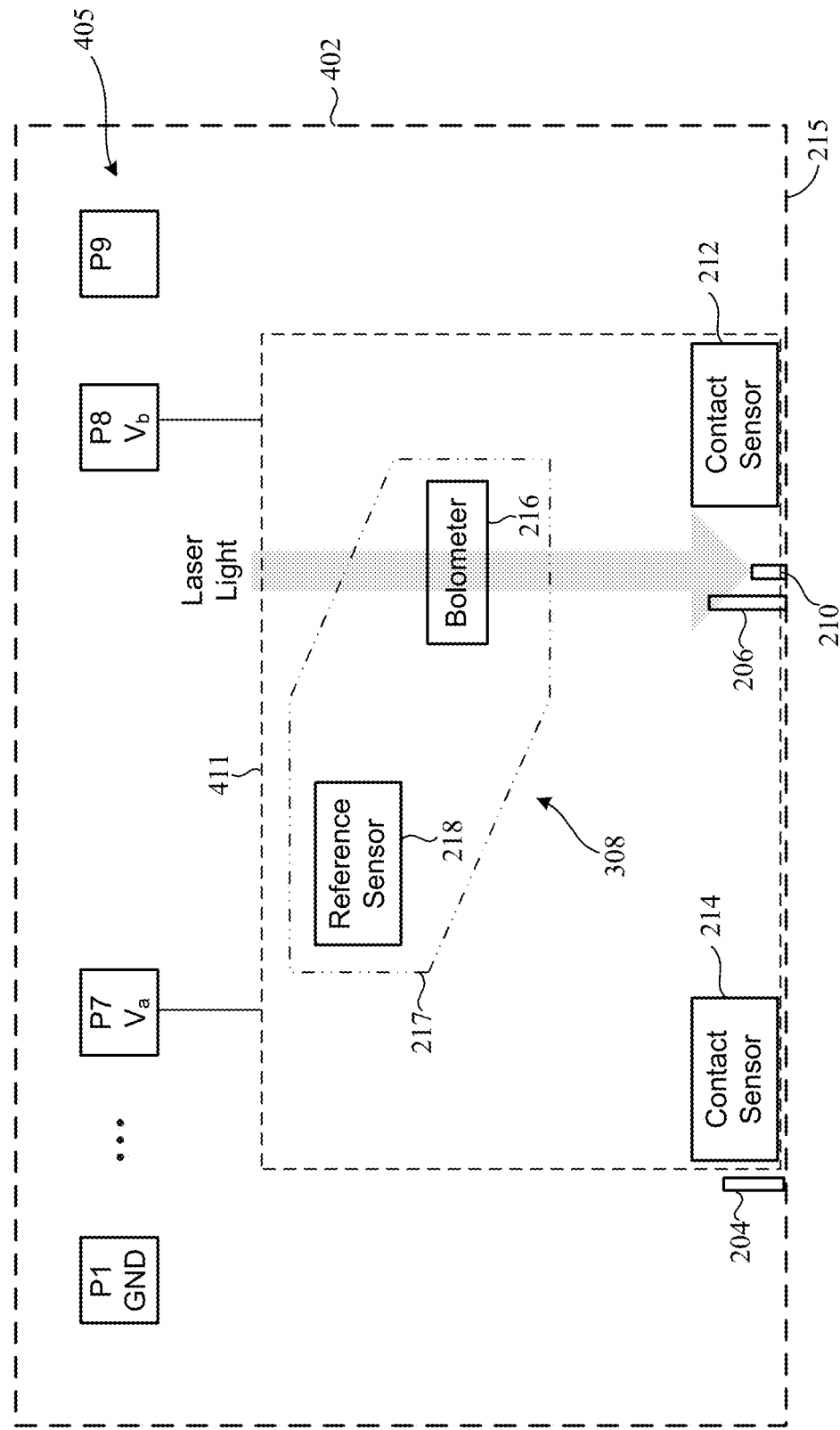
FIG. 4 shows a portion of a HAMR slider that incorporates an optical and contact sensor arrangement in accordance with various embodiments.

FIG. 4 shows a portion of a HAMR slider 402 that incorporates an optical and contact sensor arrangement in accordance with various embodiments. FIG. 4 shows a sensor arrangement 411 that is similar to the sensor arrangement 311 shown in FIG. 3. In the embodiment shown in FIG. 4, the sensor arrangement 411 includes a bolometer 216, a references sensor 218, a first contact sensor 212, and a second contact sensor 214. As will be discussed below, the bolometer 216, reference sensor 218, first contact sensor 212, and second contact sensor 214 can be connected together in a number of different ways. Notably, the sensor arrangement 411 is coupled to only two of the electrical bond pads 405 of the slider 402. As shown, the sensor arrangement 411 is coupled between a first bond pad, P7, and a second bond pad, P8. In the embodiment shown in FIG. 4, the sensor arrangement 411 is coupled only to first and second bond pads P7 and P8, and to no other electrical bond pad or ground pad.

As discussed above, the bolometer 216 is disposed on the slider 402 at a location that receives at least some of the light produced by a laser source that propagates through an optical waveguide of the slider 402. Attributes of the bolometer 216 shown in FIG. 4 can be the same as those discussed above with reference to FIG. 3. The response of the bolometer 216 is based primarily on the light impinging on it from the optical waveguide and the ambient temperature at the location where the bolometer 216 is situated on the slider 402. The reference sensor 218 is situated at a location of the slider 402 unexposed to the light but exposed to the ambient temperature. The reference sensor 218 is situated in proximity to the bolometer 216, such that the ambient temperature of the reference sensor 218 is substantially the same as the ambient temperature of the bolometer 216 (e.g., to within 1-2%). For example, the reference sensor 218 can be situated to within about 10 to 15 μm from the bolometer 216. In this regard, the bolometer 216 and the reference sensor 218 are situated on the same isotherm 217.

The bolometer 216 and the reference sensor 218 are configured or otherwise operated so that a response of these two components to a change in ambient temperature is effectively canceled. For example, the bolometer 216 can be configured to have a positive change in signal output in response to a change in ambient temperature, and the reference sensor 218 can be configured to have a negative change in signal output in response to the change in ambient temperature. It is understood that either of the bolometer 216 and the reference sensor 218 can be configured to have a positive or negative change in signal output in response to a change in ambient temperature, so long as the two components produce output signals that can be combined in a manner that allows cancellation of the effect of temperature variation.

The bolometer 216 and the reference sensor 218 can be implemented as resistive sensors each having a temperature coefficient of resistance. For example, the bolometer 216 and the reference sensor 218 can each be a metal wire having a TCR fabricated into the slider 402. Suitable materials for fabricating the bolometer 216 and the reference sensor 218 include Pt, NiFe, Ni, and other materials that have high TCR. In some implementations, it may be desirable to fabricate the electrical conductors (e.g., traces or leads) that connect the bolometer 216 to the reference sensor 218 and the optical sensor 308 to the bond pads P7 and P8 from a material (e.g., NiCu alloys) having a relatively low, or near zero, TCR.

The bolometer 216 and the reference sensor 218 are preferably constructed so that they produce output signals of substantially the same magnitude. For example, the bolometer 216 and the reference sensor 218 can have about the same resistance, and the TCR of the bolometer 216 and the reference sensor 218 can be identical in magnitude but of opposite sign. Because the bolometer 216 and the reference sensor 218 are subject to the same changes in ambient temperature, the response of the reference sensor 218 to a change in ambient temperature can be effectively subtracted from the response of the bolometer 216 to the same change in ambient temperature. Having canceled the common change to ambient temperature in the bolometer 216 and the reference sensor 218, the resulting output signal produced by the optical sensor 308 is representative predominantly of a change in output optical power of the laser source as sensed by the bolometer 216.

FIGS. 5-12 show different configurations of the sensor arrangements shown in FIGS. 3 and 4. More particularly, FIGS. 5-8 show different configurations of the sensor arrangement shown in FIG. 3, and FIGS. 9-12 show different configurations of the sensor arrangement shown in FIG. 4.

Figure 5:
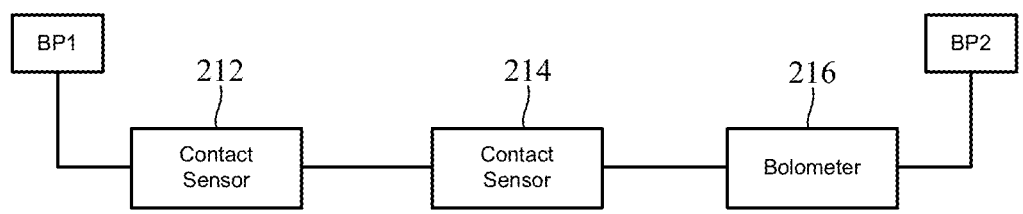
FIG. 5 is a diagram of a sensor arrangement that includes a bolometer and a multiplicity of contact sensors in accordance with various embodiments.

FIG. 5 is a diagram of a sensor arrangement that includes a bolometer and a multiplicity of contact sensors in accordance with some embodiments. The sensor arrangement shown in FIG. 5 includes two contact sensors 212 and 214 coupled in series with a bolometer 216. The series-connected contact sensors 212, 214 and bolometer 216 are coupled to a pair of bond pads, BP1 and BP2, of the slider. In the sensor arrangement shown in FIG. 5, the current passing through each of the contact sensors 212, 214 and bolometer 216 is the same. In some embodiments, the pre-amplifier that controls the bias sources coupled to bond pads BP1 and BP2 has a maximum voltage limit of 600 mV and a maximum current limit of 5 mA, and the resistances of the contact sensors 212, 214 and bolometer 216 are constrained based on the maximum voltage limit. For example, the resistance of the contact sensors 212, 214 and bolometer 216 can be about 40-100 Ohm.

Figure 6:
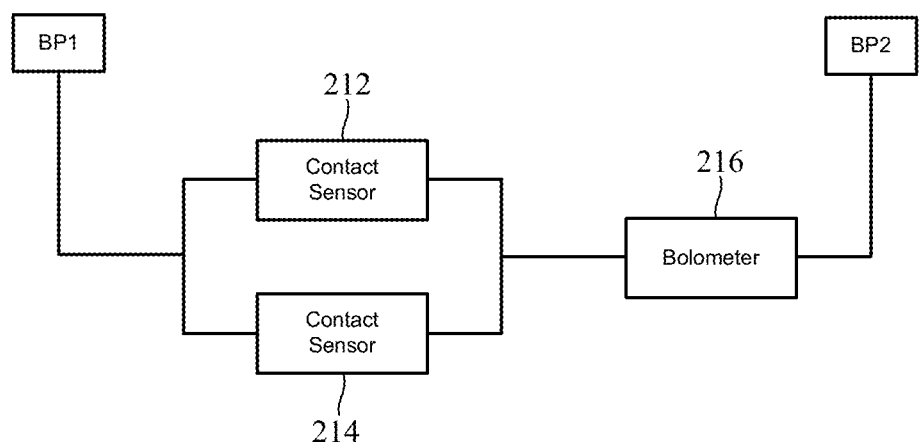
FIG. 6 is a diagram of a sensor arrangement that includes a bolometer and a multiplicity of contact sensors in accordance with some embodiments.

FIG. 6 is a diagram of a sensor arrangement that includes a bolometer and a multiplicity of contact sensors in accordance with other embodiments. The sensor arrangement shown in FIG. 6 includes two contact sensors 212 and 214 coupled in parallel. The parallel-connected contact sensors 212 and 214 are coupled in series with a bolometer 216. The contact sensors 212, 214 and bolometer 216 are coupled to a pair of bond pads, BP1 and BP2, of the slider. In some embodiments, the voltages of the contact sensors 212 and 214 are substantially the same, and the voltage of the bolometer 216 is independently tunable. Assuming a pre-amplifier that drives the bond pads BP1 and BP2 can supply a maximum voltage of 600 mV and a maximum current of 5 mA, the contact sensors 212 and 214 can have a minimum resistance of about 100 Ohm and the bolometer 216 can have a minimum resistance of about 50 Ohm.

Figure 7:
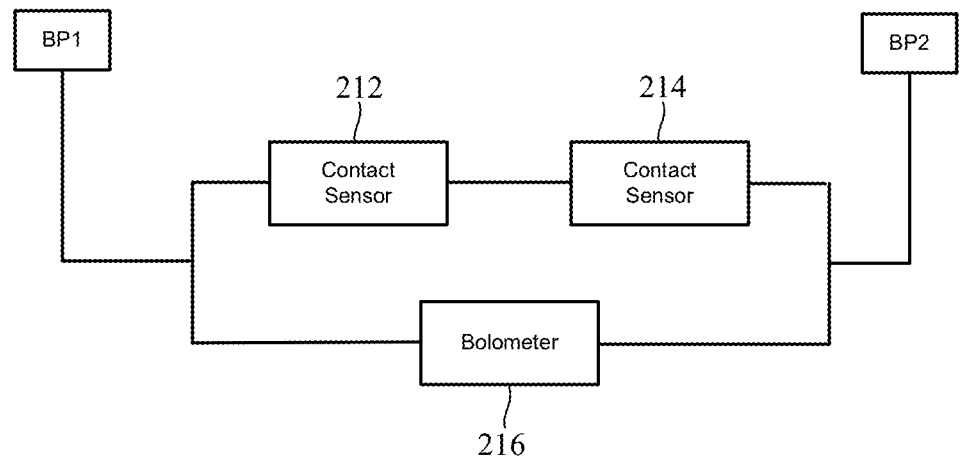
FIG. 7 is a diagram of a sensor arrangement that includes a bolometer and a multiplicity of contact sensors in accordance with other embodiments.

FIG. 7 is a diagram of a sensor arrangement that includes a bolometer and a multiplicity of contact sensors in accordance with further embodiments. The sensor arrangement shown in FIG. 7 includes two contact sensors 212 and 214 coupled in series. The series-connected contact sensors 212 and 214 are coupled in parallel with a bolometer 216. The contact sensors 212, 214 and bolometer 216 are coupled to a pair of bond pads, BP1 and BP2, of the slider. In some embodiments, the currents of the contact sensors 212 and 214 are substantially the same, and the current of the bolometer 216 is independently tunable. Assuming a pre-amplifier that drives the bond pads BP1 and BP2 can supply a maximum voltage of 600 mV and a maximum current of 5 mA, the contact sensors 212 and 214 can have a minimum resistance of about 180 Ohm and the bolometer 216 can have a minimum resistance of about 180 Ohm.

Figure 8:
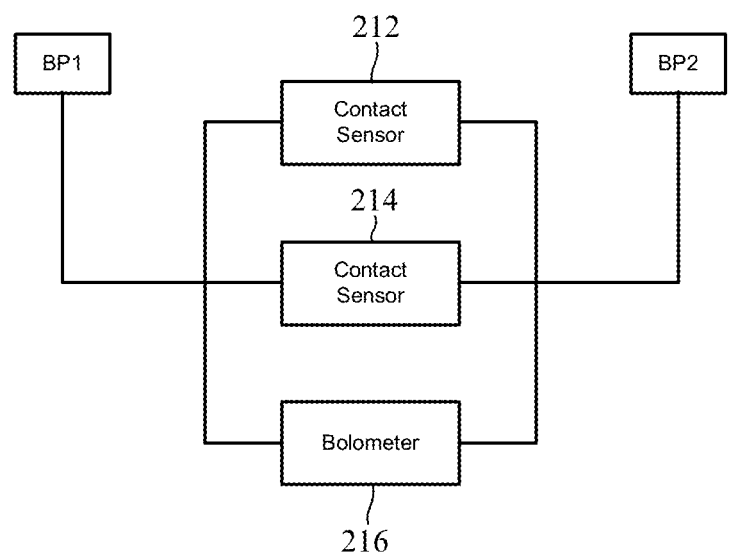
FIG. 8 is a diagram of a sensor arrangement that includes a bolometer and a multiplicity of contact sensors in accordance with some embodiments.

FIG. 8 is a diagram of a sensor arrangement that includes a bolometer and a multiplicity of contact sensors in accordance with some embodiments. The sensor arrangement shown in FIG. 8 includes two contact sensors 212 and 214 and a bolometer 216 coupled in parallel. The parallel-connected contact sensors 212, 214 and bolometer 216 are coupled to a pair of bond pads, BP1 and BP2, of the slider. In the sensor arrangement shown in FIG. 8, the voltage across each of the contact sensors 212, 214 and bolometer 216 is the same. In some embodiments, the pre-amplifier that controls the bias sources coupled to bond pads BP1 and BP2 has a maximum voltage limit of 600 mV and a maximum current limit of 5 mA, and the resistances of the contact sensors 212, 214 and bolometer 216 are constrained based on these maximum current limit. For example, the contact sensors 212 and 214 and the bolometer 216 can each have a minimum resistance of about 360 Ohm.

Figure 9:
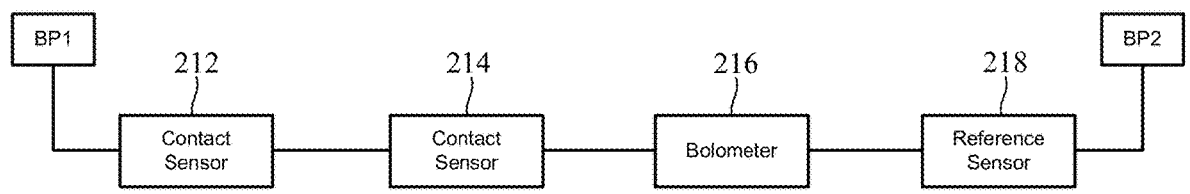
FIG. 9 is a diagram of a sensor arrangement that includes a bolometer, a reference sensor, and a multiplicity of contact sensors in accordance with various embodiments.

FIG. 9 is a diagram of a sensor arrangement that includes a bolometer, a reference sensor, and a multiplicity of contact sensors in accordance with some embodiments. The sensor arrangement shown in FIG. 9 includes two contact sensors 212 and 214 coupled in series with a bolometer 216 and a reference sensor 218. The series-connected contact sensors 212, 214, bolometer 216, and reference sensor 218 are coupled to a pair of bond pads, BP1 and BP2, of the slider. In the sensor arrangement shown in FIG. 9, the current passing through each of the contact sensors 212, 214, bolometer 216, and reference sensor 218 is the same. The resistances of the contact sensors 212, 214, bolometer 216 can be the same as those indicated in the configuration of FIG. 5, with the resistance of the reference sensor 218 being substantially the same as that of the bolometer 216. The TCR value of the bolometer 216 and reference sensor 218 can be substantially the same but opposite in sign.

Figure 10:
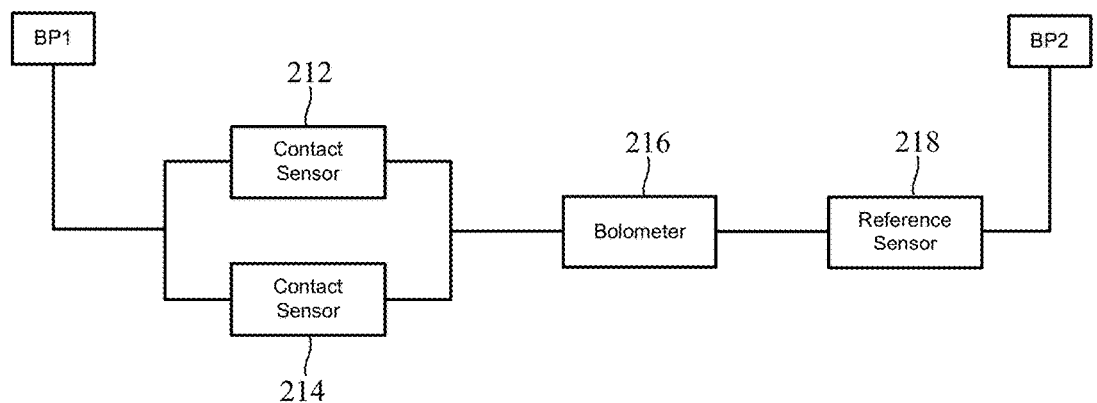
FIG. 10 is a diagram of a sensor arrangement that includes a bolometer, a reference sensor, and a multiplicity of contact sensors in accordance with some embodiments.

FIG. 10 is a diagram of a sensor arrangement that includes a bolometer, a reference sensor, and a multiplicity of contact sensors in accordance with other embodiments. The sensor arrangement shown in FIG. 10 includes two contact sensors 212 and 214 coupled in parallel. The parallel-connected contact sensors 212 and 214 are coupled in series with a bolometer 216 and a reference sensor 218. The contact sensors 212, 214, bolometer 216, and reference sensor 218 are coupled to a pair of bond pads, BP1 and BP2, of the slider. In some embodiments, the voltages of the contact sensors 212 and 214 are substantially the same, and the voltages of the bolometer 216 and reference sensor 218 are independently tunable relative to the contact sensors 212 and 214. The resistances of the contact sensors 212, 214, bolometer 216 can be the same as those indicated in the configuration of FIG. 6, with the resistance of the reference sensor 218 being substantially the same as that of the bolometer 216. The TCR value of the bolometer 216 and reference sensor 218 can be substantially the same but opposite in sign. In the embodiment shown in FIG. 10, the contact sensors 212 and 214 can have a minimum resistance of about 100 Ohm, and the bolometer 216 can have a minimum resistance of about 50 Ohm.

Figure 11:
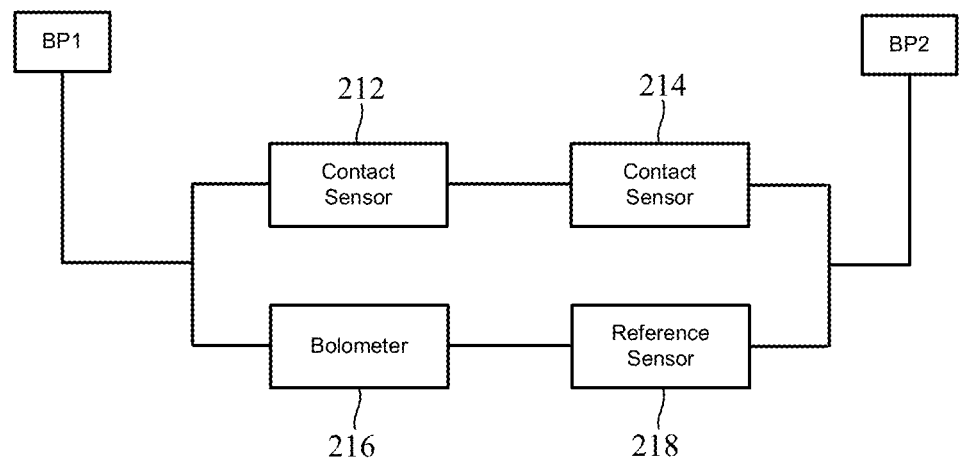
FIG. 11 is a diagram of a sensor arrangement that includes a bolometer, a reference sensor, and a multiplicity of contact sensors in accordance with other embodiments.

FIG. 11 is a diagram of a sensor arrangement that includes a bolometer, a reference sensor, and a multiplicity of contact sensors in accordance with further embodiments. The sensor arrangement shown in FIG. 11 includes two contact sensors 212 and 214 coupled in series, and a bolometer 216 coupled in series with a reference sensor 218. The series-connected contact sensors 212, 214 are coupled in parallel with the series-connected bolometer 216 and reference sensor 218. The contact sensors 212, 214, bolometer 216, and reference sensor 218 are coupled to a pair of bond pads, BP1 and BP2, of the slider. In some embodiments, the currents of the contact sensors 212 and 214 are substantially the same, and the currents of the bolometer 216 and reference sensor 218 are independently tunable relative to the contact sensors 212 and 214. The resistances of the contact sensors 212, 214, bolometer 216 can be the same as those indicated in the configuration of FIG. 7, with the resistance of the reference sensor 218 being substantially the same as that of the bolometer 216. The TCR value of the bolometer 216 and reference sensor 218 can be substantially the same but opposite in sign.

Figure 12:
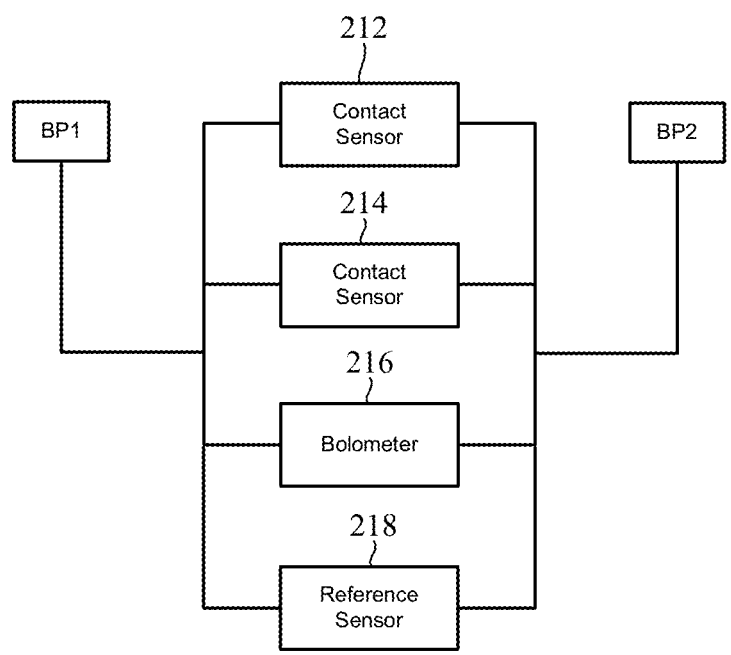
FIG. 12 is a diagram of a sensor arrangement that includes a bolometer, a reference sensor, and a multiplicity of contact sensors in accordance with some embodiments.

FIG. 12 is a diagram of a sensor arrangement that includes a bolometer, a reference sensor, and a multiplicity of contact sensors in accordance with some embodiments. The sensor arrangement shown in FIG. 12 includes two contact sensors 212 and 214, a bolometer 216, and a reference sensor 218 coupled in parallel. The parallel-connected contact sensors 212, 214, bolometer 216, and reference sensor 218 are coupled to a pair of bond pads, BP1 and BP2, of the slider. In the sensor arrangement shown in FIG. 12, the voltage across each of the contact sensors 212, 214, bolometer 216, and reference sensor 218 is the same. The resistances of the contact sensors 212, 214, bolometer 216 can be the same as those indicated in the configuration of FIG. 8, with the resistance of the reference sensor 218 being substantially the same as that of the bolometer 216. The TCR value of the bolometer 216 and reference sensor 218 can be substantially the same but opposite in sign.

Systems, devices or methods disclosed herein may include one or more of the features structures, methods, or combination thereof described herein. For example, a device or method may be implemented to include one or more of the features and/or processes above. It is intended that such device or method need not include all of the features and/or processes described herein, but may be implemented to include selected features and/or processes that provide useful structures and/or functionality. Various modifications and additions can be made to the disclosed embodiments discussed above. Accordingly, the scope of the present disclosure should not be limited by the particular embodiments described above, but should be defined only by the claims set forth below and equivalents thereof.

What is claimed is:

1. An apparatus, comprising:
a slider of a heat-assisted magnetic recording head comprising an air bearing surface and an optical waveguide configured to receive light from a laser source, the slider comprising a plurality of electrical bond pads including a first bond pad and a second bond pad, the slider further comprising:
a bolometer; and
a plurality of contact sensors;
wherein the bolometer and the contact sensors are coupled together between the first and second bond pads.

2. The apparatus of claim 1, wherein the bolometer and the contact sensors are coupled together in series between the first and second bond pads.

3. The apparatus of claim 1, wherein:
the plurality of contact sensors comprises at least a first contact sensor and a second contact sensor;
the first contact sensor is coupled in parallel with the second contact sensor; and
the parallel-connected first and second contact sensors are coupled in series with the bolometer.

4. The apparatus of claim 1, wherein:
the plurality of contact sensors comprises at least a first contact sensor and a second contact sensor;
the first contact sensor is coupled in series with the second contact sensor; and
the series-connected first and second contact sensors are coupled in parallel with the bolometer.

5. The apparatus of claim 1, wherein:
the plurality of contact sensors comprises at least a first contact sensor and a second contact sensor; and
the first contact sensor, the second contact sensor, and the bolometer are coupled in parallel between the first and second bond pads.

6. The apparatus of claim 1, wherein:
at least one of the plurality of contact sensors is located at or near a first close point of the slider; and
at least one other of the plurality of contact sensors is located at or near a second close point of the slider, the second close point spaced apart from the first close point.

7. The apparatus of claim 6, wherein:
the first close point is a writer close point of the slider; and
the second close point a reader close point of the slider.

8. The apparatus of claim 1, wherein at least one of the plurality of contact sensors is configured to sense contact between the slider and a magnetic recording medium and for contact between the slider and an asperity of the magnetic recording medium.

9. The apparatus of claim 1, wherein the bolometer comprises a metal wire fabricated into the slider.

10. The apparatus of claim 1, wherein:
the bolometer comprises one of Pt, NiFe, and Ni; and
the contact sensors comprise one of NiFe, Ni, Pt, Ru, and Rh.

11. An apparatus, comprising:
a slider of a heat-assisted magnetic recording head comprising an air bearing surface and an optical waveguide configured to receive light from a laser source, the slider comprising a plurality of electrical bond pads including a first bond pad and a second bond pad, the slider further comprising:
a plurality of contact sensors located at or near the air bearing surface; and
a bolometer located away from the air bearing surface relative to locations of the plurality of contact sensors;

wherein the bolometer and the plurality of contact sensors are coupled together between the first and second bond pads.

12. The apparatus of claim 11, wherein the bolometer is located within a cladding layer of the optical waveguide and spaced apart from a core of the optical waveguide.

13. The apparatus of claim 12, wherein the bolometer is located within about 5 μm from a centerline of the core.

14. The apparatus of claim 11, wherein the bolometer comprises a metal wire fabricated into the slider.

15. The apparatus of claim 11, wherein the bolometer and the contact sensors have about the same resistance.

16. The apparatus of claim 11, wherein each of the bolometer and the contact sensors has a resistance ranging from about 40 Ohm to about 100 Ohm.

17. The apparatus of claim 11, wherein:

the bolometer comprises one of Pt, NiFe, and Ni; and the contact sensors comprise one of NiFe, Ni, Pt, Ru, and Rh.

18. An apparatus, comprising:

a slider of a heat-assisted magnetic recording head comprising an air bearing surface and an optical waveguide configured to receive light from a laser source, the slider comprising a plurality of electrical bond pads including a first bond pad and a second bond pad, the slider further comprising:

a bolometer; and a plurality of contact sensors, the contact sensors and the bolometer coupled together between the first and second bond pads;

wherein the first and second bond pads are coupled to a pre-amplifier having a maximum voltage limit and a maximum current limit, and resistances of the contact sensors and the bolometer are constrained based on the maximum voltage limit.

19. The apparatus of claim 18, wherein the resistances of the contact sensors and the bolometer are about the same.

20. The apparatus of claim 18, wherein the resistances of the contact sensors and the bolometer range from about 40 to about 100 Ohm.

* * * * *